(12) United States Patent
Miyamoto et al.

(10) Patent No.: US 8,310,725 B1
(45) Date of Patent: Nov. 13, 2012

(54) PRINT PROCESSING DEVICE AND CONTROL METHOD WITH REGISTRATION OF UNREGISTERED LANGUAGE REQUIRED TO PERFORM FUNCTION

(75) Inventors: Yumi Miyamoto, Kawasaki (JP); Masao Maeda, Kawasaki (JP); Akinori Horiuchi, Yokohama (JP); Yoshiyuki Hirai, Kunitachi (JP); Keisuke Niimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/541,139

(22) Filed: Jul. 3, 2012

Related U.S. Application Data (63) Continuation of application No. 12/511,657, filed on Jul. 29, 2009, now Pat. No. 8,237,987.

(30) Foreign Application Priority Data

Aug. 7, 2008  (JP) .................................. 2008-203832

(51) Int. Cl.
   *G06K 15/02* (2006.01)
   *G06K 9/20* (2006.01)
   *G06K 19/00* (2006.01)
   *H04N 1/00* (2006.01)

(52) U.S. Cl. ........ 358/1.9; 358/1.13; 358/442; 358/468; 382/317

(58) Field of Classification Search .................... 358/1.2, 358/1.9, 2.1, 3.26, 3.27, 1.11, 1.13, 1.15, 358/1.18, 501, 518, 527, 528, 530, 537, 538, 358/401, 403, 442, 443, 447, 448, 461, 451, 358/452, 453, 462, 463, 468, 296; 382/317
See application file for complete search history.

(56) References Cited

U.S. PATENT DOCUMENTS

| 6,669,085 | B1* | 12/2003 | Bergen | 235/375 |
| 2003/0236973 | A1* | 12/2003 | Nelson et al. | 713/2 |
| 2006/0050323 | A1* | 3/2006 | Wada | 358/302 |
| 2009/0303519 | A1* | 12/2009 | Shimatani et al. | 358/1.15 |

* cited by examiner

*Primary Examiner* — Scott A Rogers
(74) *Attorney, Agent, or Firm* — Canon U.S.A., Inc. IP Division (57) ABSTRACT

A print processing device including a printing unit to print an image on a sheet, a reading unit to read a sheet, an operation unit including keys to be operated by a user, a print control unit to cause the printing unit to print either a first sheet for selecting an image from a plurality of images stored in a storage medium or a second sheet for selecting a language to be used in the first sheet, and an analyzing unit configured to analyze an image read by the reading unit. If a language is not registered, when the image corresponding to the second sheet is detected as an analysis result by the analyzing unit, the first sheet is printed using a language associated with the detected image and when the image corresponding to the second sheet is not detected, the second sheet is printed.

3 Claims, 9 Drawing Sheets

FIG. 1

100 : MFP DEVICE

600:PRINT INSTRUCTION SHEET

601 HEADER SECTION:
- PRINT SETTING — PLEASE SELECT ANY ONE: L SIZE, 2L SIZE, A4, LTR
- OPTION SETTING: DATE, AUTOMATIC CORRECTION, BRIGHT CORRECTION, FACE CORRECTION, RED-EYE CORRECTION
- PLEASE MARK PHOTO INTENDED TO PRINT FROM FOLLOWINGS / PRINT ALL PHOTOS

602 IMAGE SELECTION SECTION: images numbered 1–30

603 FOOTER SECTION: PLEASE SET THIS SHEET ON READING STAND AND PUSH "SCAN" BUTTON

604 BARCODE SECTION

600: PRINT INSTRUCTION SHEET

601 HEADER SECTION
- PRINT SETTING | PLEASE SELECT ANY ONE
  - L SIZE ○  2L SIZE ●  A4 ○  LTR ○
- OPTION SETTING | ● DATE  ● AUTOMATIC CORRECTION  ○ BRIGHT FACE CORRECTION  ● RED-EYE CORRECTION
- PLEASE MARK PHOTO INTENDED TO PRINT FROM FOLLOWINGS  ○ PRINT ALL PHOTOS

602 IMAGE SELECTION SECTION

| 1 ○○○ | 2 ●○○ | 3 ○○○ | 4 ○○○ | 5 ○○○ | 6 ○○○ |
| 7 ●○○ | 8 ○○● | 9 ○○○ | 10 ○○○ | 11 ○○○ | 12 ○○○ |
| 13 ○○○ | 14 ○○○ | 15 ●○○ | 16 ○○○ | 17 ○○○ | 18 ○○○ |
| 19 ○○○ | 20 ○○○ | 21 ●○○ | 22 ○○○ | 23 ○○○ | 24 ○○○ |
| 25 ○○○ | 26 ○○○ | 27 ○○○ | 28 ○●○ | 29 ●○○ | 30 ○○○ |

603 FOOTER SECTION
- PLEASE SET THIS SHEET ON READING STAND AND PUSH "SCAN" BUTTON
- PAPER FEED PORT | ○ CASSETTE  ● REAR TRAY  ○ REPRINT THIS MARK-SENSING SHEET

604 BARCODE SECTION
■■■□■■□■□■■□■■■□■■■□■■□■□■■□■■■□■■■□■■□■□■■□■■■

PRINT PROCESSING DEVICE AND CONTROL METHOD WITH REGISTRATION OF UNREGISTERED LANGUAGE REQUIRED TO PERFORM FUNCTION

CROSS-REFERENCE TO RELATED APPLICATIONS

This application is a continuation of U.S. patent application Ser. No. 12/511,657, filed Jul. 29, 2009, which claims the benefit of Japanese Application No. 2008-203832, filed Aug. 7, 2008, both of which are hereby incorporated by reference herein in their entirety.

BACKGROUND OF THE INVENTION

1. Field of the Invention

The present invention relates to a print processing device for printing a sheet and controlling printing according to a result of reading the filled out sheet.

2. Description of the Related Art

In recent years, a multifunction peripheral (hereinafter referred to as MFP) having both a reading unit configured to read a document and a printing unit configured to perform printing has been widely used, and various techniques utilizing the two functions are discussed. One of these techniques is a technique for printing a mark sheet (a mark-sensing sheet) which is filled out with a pencil or a pen by a user, reading the filled-out mark sheet, analyzing an image acquired by reading the mark-sensing sheet, and controlling printing based on a result of analysis (hereinafter referred to as a "sheet scanning system").

As for an example of the sheet scanning system, Japanese Patent No. 3,343,280 discusses a function for printing the image according to a result of reading the mark-sensing sheet when a user designates a desired image and number of print copies using the mark-sensing sheet. Further, Japanese Patent No. 3,343,280 discusses a technique in which a user can use a plurality of types of mark-sensing sheets in the sheet scanning system. The sheet scanning system determines a type of the mark-sensing sheet when the system reads the mark-sensing sheet and controls printing according to the type of the mark-sensing sheet determined.

Japanese Patent No. 2,818,044 discusses a sheet scanning system by which a user can perform settings of an MFP or select a method of printing an image.

Thus, even when an MFP does not include a user interface such as a display device or a key device, notification of information to a user and input of an instruction from a user can be performed by using the sheet scanning system.

When printing is controlled using a mark-sensing sheet, a sheet to be printed includes various kinds of guidance for a user such as a content of the sheet, a method for filling out the sheet, and an operation procedure of the sheet scanning system. Although the guidance needs to be described with a proper language for a user, a native language of the user cannot be limited to one language. Therefore, the MFP using the sheet scanning system needs to support a plurality of languages and allows a user to select a language to be used.

However, when a device does not include proper user interfaces such as a display device and a key device, the aforementioned selecting of the language may be difficult. Therefore, the device needs a sheet for setting a language used for printing on a mark-sensing sheet in addition to a sheet for executing intended processing. Thus, it becomes difficult for a user to understand an entire operation procedure.

SUMMARY OF THE INVENTION

The present invention is directed to a print processing device capable of automatically printing a necessary sheet even when a language is not set in a sheet scanning system.

According to an aspect of the present invention, a print processing device including a printing unit configured to print an image on a sheet, a reading unit configured to read a sheet placed on a document stand, an operation unit configured to include a plurality of keys and to be operated by a user, a print control unit configured to cause the printing unit to print at least any one of a first sheet for selecting an image from a plurality of images stored in a storage medium and a second sheet for selecting a language to be used in the first sheet, a reading control unit configured to cause the reading unit to execute reading in response to pressing of a predetermined key included in the operation unit, and an analyzing unit configured to analyze an image acquired as a result of reading by the reading control unit. If a language is not registered, when the image corresponding to the second sheet is detected as a result of analysis by the analyzing unit, the print control unit causes the printing unit to print the first sheet using a language associated with the detected image and when the image corresponding to the second sheet is not detected as the result of analysis by the analyzing unit, the print control unit causes the printing unit to print the second sheet.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
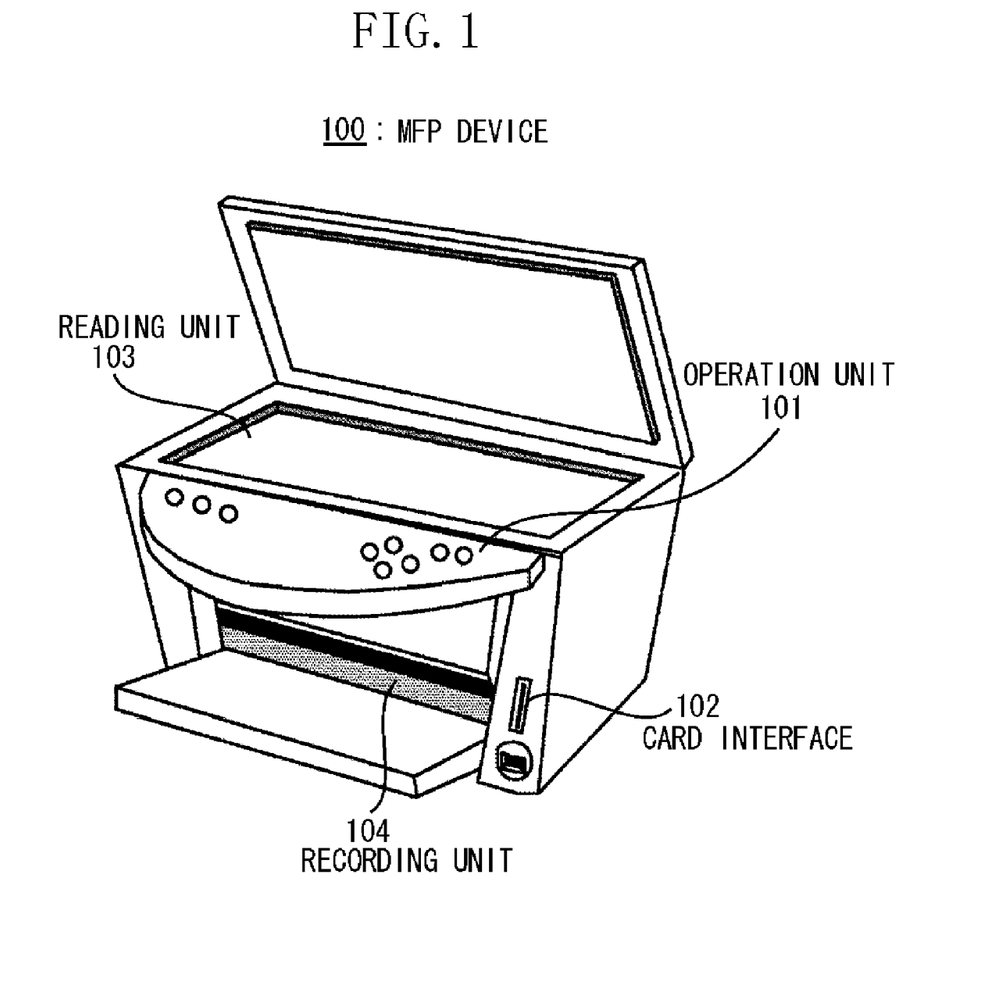
FIG. 1 is a schematic perspective view illustrating an MFP.

FIG. 1 is a schematic perspective view illustrating an MFP 100. The MFP 100 is an example of a printing device and includes an operation unit 101, a card interface 102, a reading unit 103, and a recording unit 104. The MFP 100 is initially set up with the reading unit 103 and the recording unit 104 closed. When a user performs copying or prints a photograph by a sheet scanning system, the reading unit 103 and the recording unit 104 are opened as illustrated in FIG. 1 and the MFP 100 executes functions requested by the user.

Figure 2:
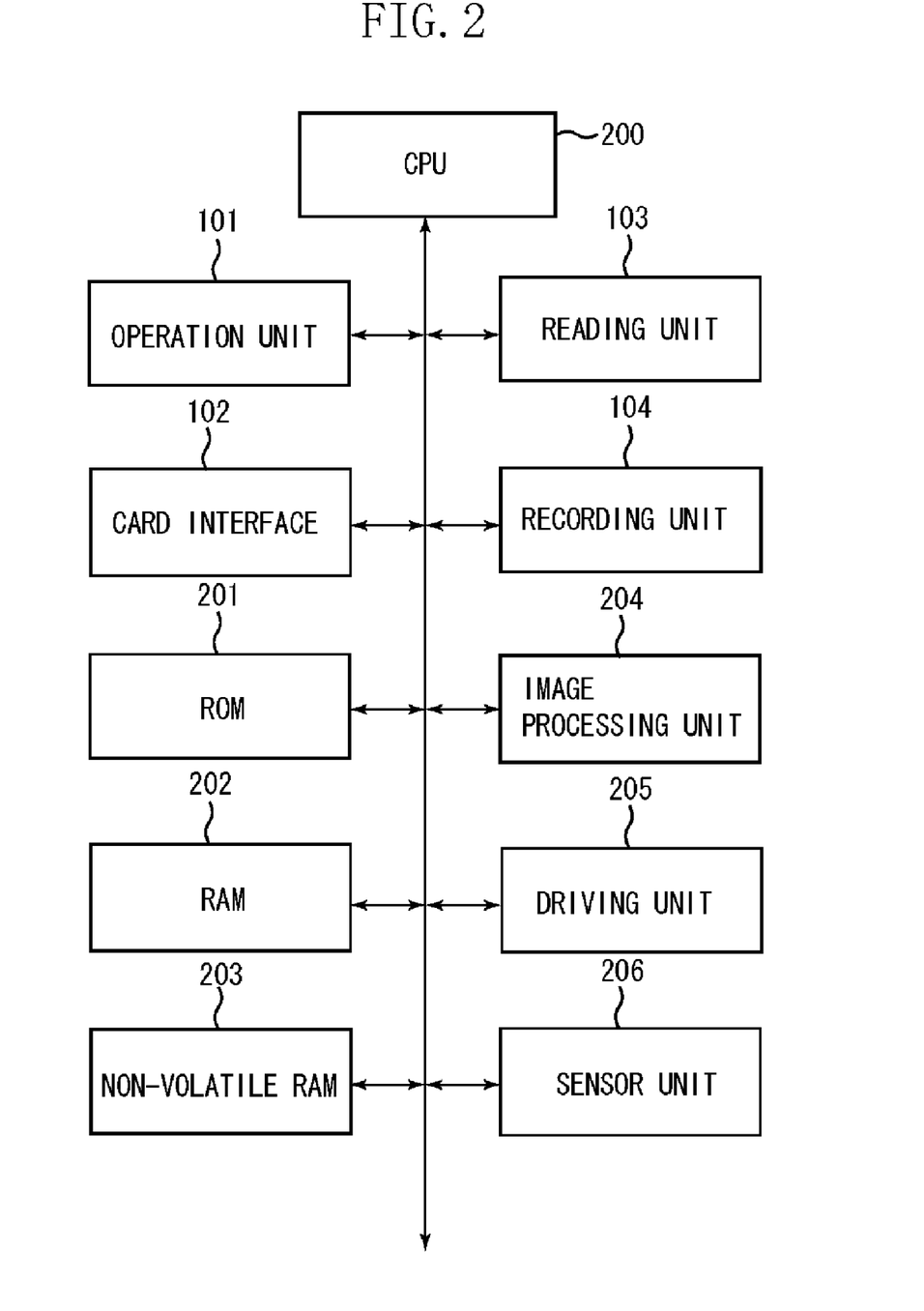
FIG. 2 is a block diagram illustrating a configuration of an MFP.

FIG. 2 is a block diagram illustrating a configuration of the MFP 100. The same reference numerals are added to the same components in FIG. 1. The MFP 100 includes the operation unit 101, the card interface 102, the reading unit 103, the recording unit 104, a central processing unit (CPU) 200, a read only memory (ROM) 201, a random access memory (RAM) 202, a nonvolatile RAM 203, an image processing unit 204, a driving unit 205, and a sensor unit 206.

The CPU 200 controls various functions of the MFP 100 and executes a program for image processing stored in the ROM 201 in response to a predetermined operation in the operation unit 101.

The ROM 201 stores a control command program of the MFP 100. The reading unit 103 includes a charge coupled device (CCD). The CCD reads a document image and outputs analog luminance data of red (R), green (G), and blue (B) colors. The reading unit 103 can include a contact image sensor (CIS) instead of the CCD. Further, the reading unit 103 can be also used for reading a device control sheet and a language setting sheet 500, which are described below.

The card interface 102 reads image data photographed by a digital still camera (hereinafter referred to as DSC) and stored in a memory card in response to a predetermined operation of the operation unit 101. A color space of the image data which is read via the card interface 102 is converted from a color space of the DSC (e.g., YCbCr color space) to a standard RGB color space (e.g., National Television System Committee (NTSC)-RGB color space or standard RGB (sRGB) color space), if necessary. The read image data is subjected to various processing needed for an application, e.g., resolution conversion to an effective pixel number, if necessary, based on header information included in an image file including the image data.

The image processing unit 204 executes image processing, such as image analysis, thumbnail creation, thumbnail correction, and output image correction. The print data acquired by these image processing is stored in the RAM 202. When the print data stored in the RAM 202 reaches a predetermined amount which is required to record the data in the recording unit 104, the recording unit 104 executes a recording operation. In the above described image processing, different pieces of the print data are created according to various print settings, e.g., a recording paper size, a recording paper type, whether date is entered or not, and whether borderless printing is performed or not.

The nonvolatile RAM 203 is a battery backed-up static random access memory (SRAM) and stores data specific to the MFP 100. In order to select image data stored in a storage medium and start recording, the operation unit 101 includes a sheet scan start key in the sheet scanning system, and a monochrome image copy start key and a color image copy start key for monochrome image copying and color image copying. The operation unit 101 further includes a color image start key, a mode key for designating a mode such as copy resolution and a image quality, a stop key for stopping a copy operation, a numeric keypad and a registration key for inputting a number of copies, and a cursor key for designating a unit for selecting an image file to be printed. The CPU 200 detects pressed states of these keys and controls each unit according to these pressed states.

The recording unit 104 includes an inkjet head in an inkjet system, and a general-use integrated circuit (IC). The recording unit 104 reads storage data stored in the RAM 202 and prints and outputs the storage data as a hard copy according to a control of the CPU 200. The driving unit 205 includes a stepping motor for driving sheet feeding and discharging rollers in operation of the reading unit 103 and the recording unit 104, gears for transmitting driving force of the stepping motor, and a driver circuit for controlling the stepping motor.

The sensor unit 206 includes a recording sheet width sensor, a recording sheet presence sensor, a document width sensor, a document presence sensor, and a recording medium detection sensor. The CPU 200 detects states of a document and a recording sheet based on information acquired from these sensors.

The MFP 100 has the configuration illustrated in FIG. 2, however, the MFP 100 is not particularly limited to that configuration. For example, although the MFP 100 in FIG. 2 does not have a display unit, the MFP can have the display unit. Further, in the example illustrated in FIG. 2, the MFP 100 reads image data from a memory card using the card interface 102, but can read an image from a storage device fixed in the MFP or an external storage device connected by wired or wireless connection.

Figure 3:
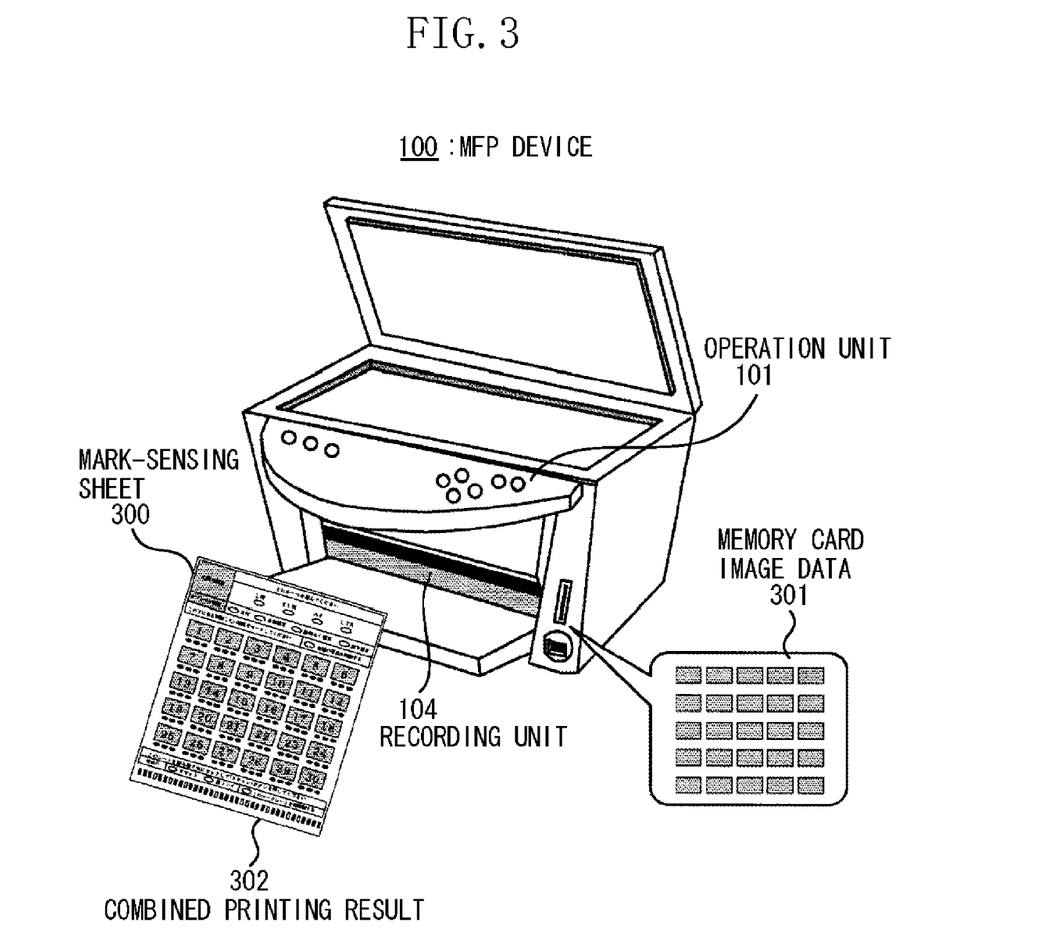
FIG. 3 illustrates printing of a mark-sensing sheet.
Figure 4:
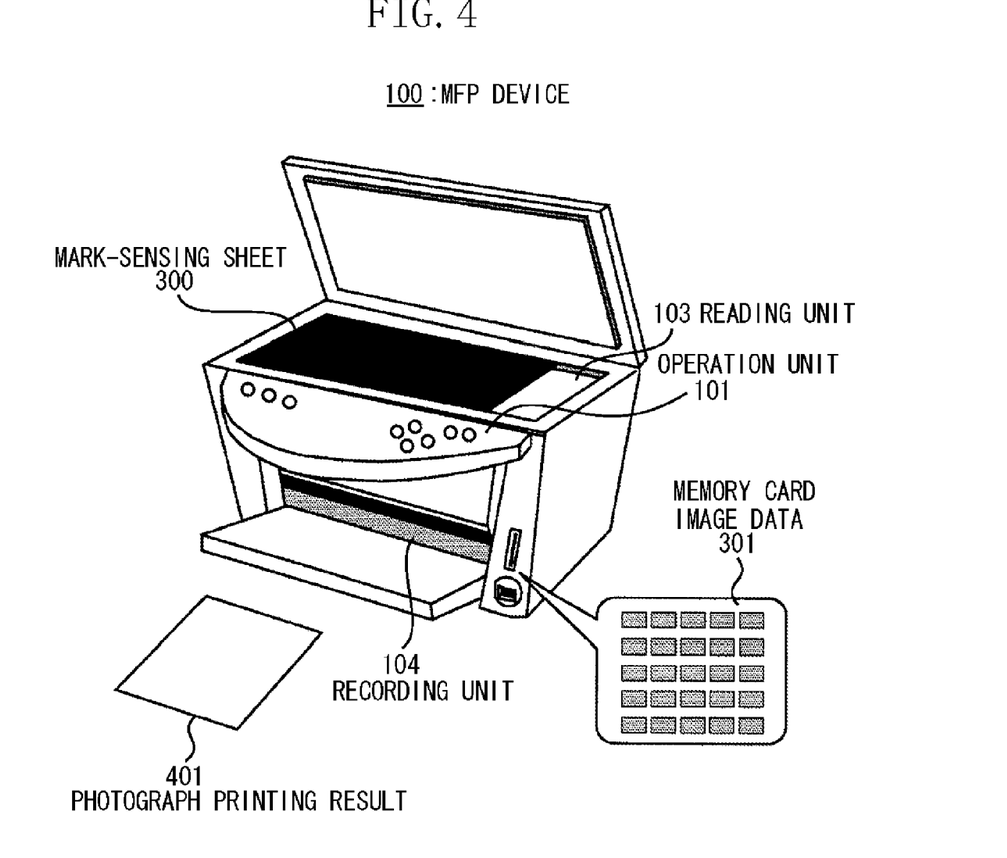
FIG. 4 illustrates photography printing according to a mark-sensing sheet.

Processing for implementing a function for connecting the DSC and the MFP and printing a photograph taken by the DSC (hereinafter referred to as "direct photography printing") using the sheet scanning system will be described. An operation of the present exemplary embodiment will be described below. FIG. 3 illustrates printing of a mark-sensing sheet. FIG. 4 illustrates photography printing according to the mark-sensing sheet. A photography printing function is implemented by the sheet scanning system such that a photograph which a user desires is printed by printing a mark-sensing sheet 300 illustrated in FIG. 3 and analyzing the mark-sensing sheet 300 illustrated in FIG. 4.

As illustrated in FIG. 3, when the MFP performs photography printing by the sheet scanning system, the recording unit 104 prints the mark-sensing sheet 300 first. In the mark-sensing sheet, an image data 301 stored in a memory card connected to the MFP 100 is arranged with a predetermined layout. The image data can be data stored in the memory card or a thumbnail image with low resolution created in the image processing unit 204. Further, if the stored image data is a file having an exchangeable image file (Exif) format, the file includes a thumbnail image in its header area, so that the recording unit 104 can acquire and print the thumbnail image.

As illustrated in FIG. 4, the reading unit 103 scans and analyzes the mark-sensing sheet 300 and a photography printing result 401 is printed according to a result determined from a content filled out by a user.

A sheet for instructing photography printing in the sheet scanning system will be referred to as "a print instruction sheet". A user can designate image data, set a number of print copies of the designated image data, and designate a print method of the image data designated, by filling out the print instruction sheet. The MFP 100 executes print control according to a result of scanning and analyzing the print instruction sheet.

In order to print the print instruction sheet, it is necessary to previously determine a describing language in the print instruction sheet. In the exemplary embodiment, the MFP 100 determines which language is used for printing the print instruction sheet, by using the sheet scanning system. The sheet will be referred to as "a language setting sheet".

Figure 5:
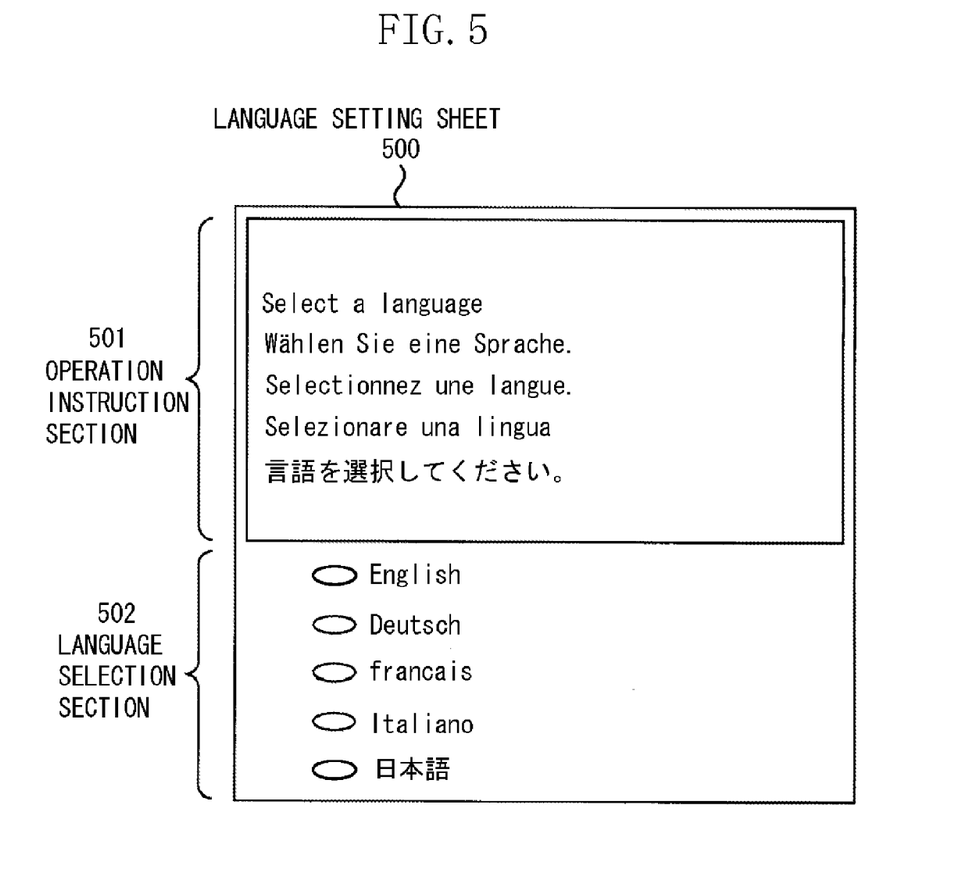
FIG. 5 illustrates a language setting sheet to be printed by an MFP.

FIG. 5 illustrates a language setting sheet 500 printed by the MFP 100. In the exemplary embodiment, the MFP 100 executes the direct photography printing using the above described print instruction sheet and language setting sheet.

The language setting sheet 500 is a sheet for determining which language is used for printing the print instruction sheet with the MFP 100, by using the sheet scanning system. The language setting sheet 500 illustrated in FIG. 5 is, for example, a print laid out on a recording sheet of an A4 size and includes an operation instruction section 501 and a language selection section 502.

The operation instruction section 501 is an area for describing an operation procedure so that a user can smoothly perform an operation using the language setting sheet 500. For example, a method for filling out the language setting sheet 500 and an operation method using the filled-out language setting sheet 500 are described in the operation instruction section 501. In FIG. 5, the operation procedure is described by a respective language which can be used to set an instruction by filling out the language setting sheet 500. In the exemplary embodiment, a content to be described in the operation instruction section 501 is not particularly limited.

The language selection section 502 is an area into which a user inputs a language by filling out that the user wants to use in the print instruction sheet. In the example in FIG. 5, selectable languages are English, German, French, Italian, and Japanese, and the user can select one language among them. In the language selection section 502, selectable languages are described by the respective languages. A number and kinds of languages which can be selected in the language selection section 502 are not limited to the example illustrated in FIG. 5. In the exemplary embodiment, layouts of the operation instruction section 501 and language selection section 502 are not specified. Thus, the language setting sheet 500 can also be formed with a layout other than the one illustrated in FIG. 5.

As described above, the language setting sheet 500 is printed assuming that there is a plurality of languages to be used by a user. Accordingly, even the MFP which does not have a display unit can set a language to be used on the print instruction sheet.

A print instruction sheet 600 will be described. The print instruction sheet 600 in the exemplary embodiment is a sheet used for executing a setting necessary for the direct photography printing by the sheet scanning system. Contents to be instructed by the print instruction sheet 600 are roughly divided into two parts. A first instruction is a print control instruction indicating a content of print control which is necessary for the recording unit 104 to print the print data. A second instruction is an image selection instruction for designating which image data stored in a memory is an object to be printed.

Figure 6:
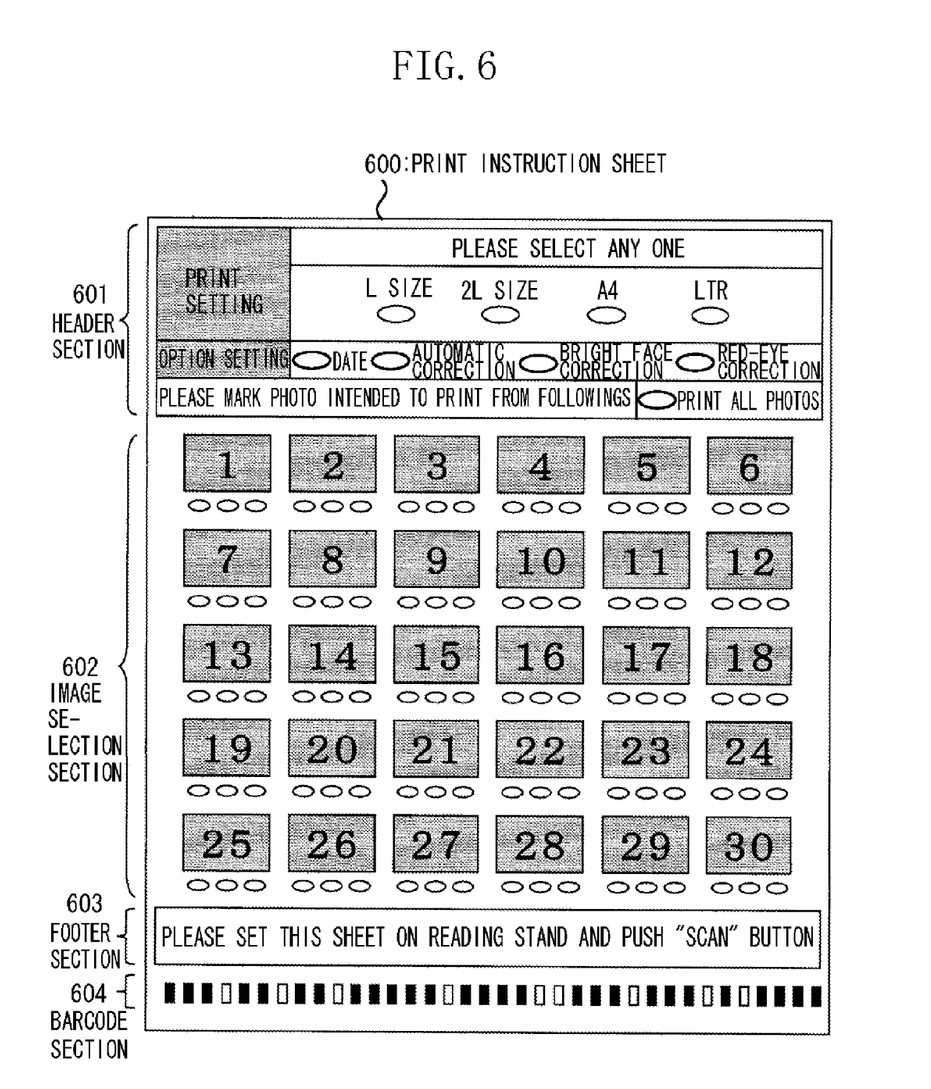
FIG. 6 illustrates a print instruction sheet to be printed by an MFP.

FIG. 6 illustrates the print instruction sheet 600 printed by the MFP 100. The print instruction sheet 600 is, for example, a print laid out on a recording sheet of an A4 size. The print instruction sheet 600 in FIG. 6 includes a header section 601, an image selection section 602, a footer section 603, and a barcode section 604.

The header section 601 is an area for inputting the print control instruction by filling out the section. The print control instruction which can be made in the section depends on specifications of the recording unit 104 and the image processing unit 204 of the MFP 100. Therefore, a user utilizes a mark-sensing sheet system which is appropriate to a method for selecting a desired setting from among options previously provided conforming to the specifications of the MFP 100.

More specifically, in an item of "print setting" in the header section 601 illustrated in FIG. 6, a user can select one of a L size, a 2L size, an A4 size, and a letter (LTR) size. As an item of "option setting" in the header section 601, options relating to effect processing about an image to be printed are provided. In FIG. 6, the user can select any of the date, an automatic correction, a bright face correction, and a red-eye correction. In the exemplary embodiment, a content of print control set in the header section 601 is not particularly limited, and "print setting" or "option setting" can also include setting contents other than the setting contents illustrated in FIG. 6, and the setting contents can be different according to the language set in the language setting sheet 500.

The image selection section 602 is an area for inputting the object to be printed, by filling out the section, from among the image data of the memory. Selectable images in the section are stored in the memory and reduced in a layout in the print instruction sheet 600. The image selection section 602 illustrated in FIG. 6 is configured such that a user can select a total of 30 images from an image "1" to an image "30". Therefore, when the memory stores 31 or more images, two or more sheets of the print instruction sheet 600 are printed. In the exemplary embodiment, 30 selectable images can be laid out in the image selection section 602 in the print instruction sheet 600, but a number of the images to be laid out is not particularly specified.

The footer section 603 describes an operation procedure performed after a user fills out the print instruction sheet 600. The print instruction sheet 600 in the exemplary embodiment has the footer section 603, but the footer section 603 is not indispensable.

The barcode section 604 includes information necessary for the direct photography printing other than the print control instruction designated in the header section 601. For example, the barcode section 604 includes a total number of images included in the print instruction sheet 600 (30 images in FIG. 6) and information used for determining image data corresponding to an image to be printed in stored image data. The barcode section 604 also indicates a type of a sheet. In the exemplary embodiment, a format of the barcode section 604 is not particularly specified.

In the exemplary embodiment, layout of the header section 601, the image selection section 602, the footer section 603, and the barcode section 604 are not particularly specified. Thus, the print instruction sheet 600 can also be formed by a specification other than the layout illustrated in FIG. 6. The print instruction sheet 600 in FIG. 6 is displayed in English but any language set in the language setting sheet 500 can be used in the print instruction sheet 600.

An entire operation of the direct photography printing according to the exemplary embodiment in which a user executes printing of a photograph taken by the DSC using the sheet scanning system will be described.

Mark-sensing sheets used in the exemplary embodiment are the language setting sheet 500 and the print instruction sheet 600. The memory card is used as a storage device. The memory card storing the photograph taken by the DSC is inserted into the card interface 102 and image data is acquired. It is assumed that a key device in the operation unit 101 used in the exemplary embodiment is only a sheet scan start key.

Figure 7:
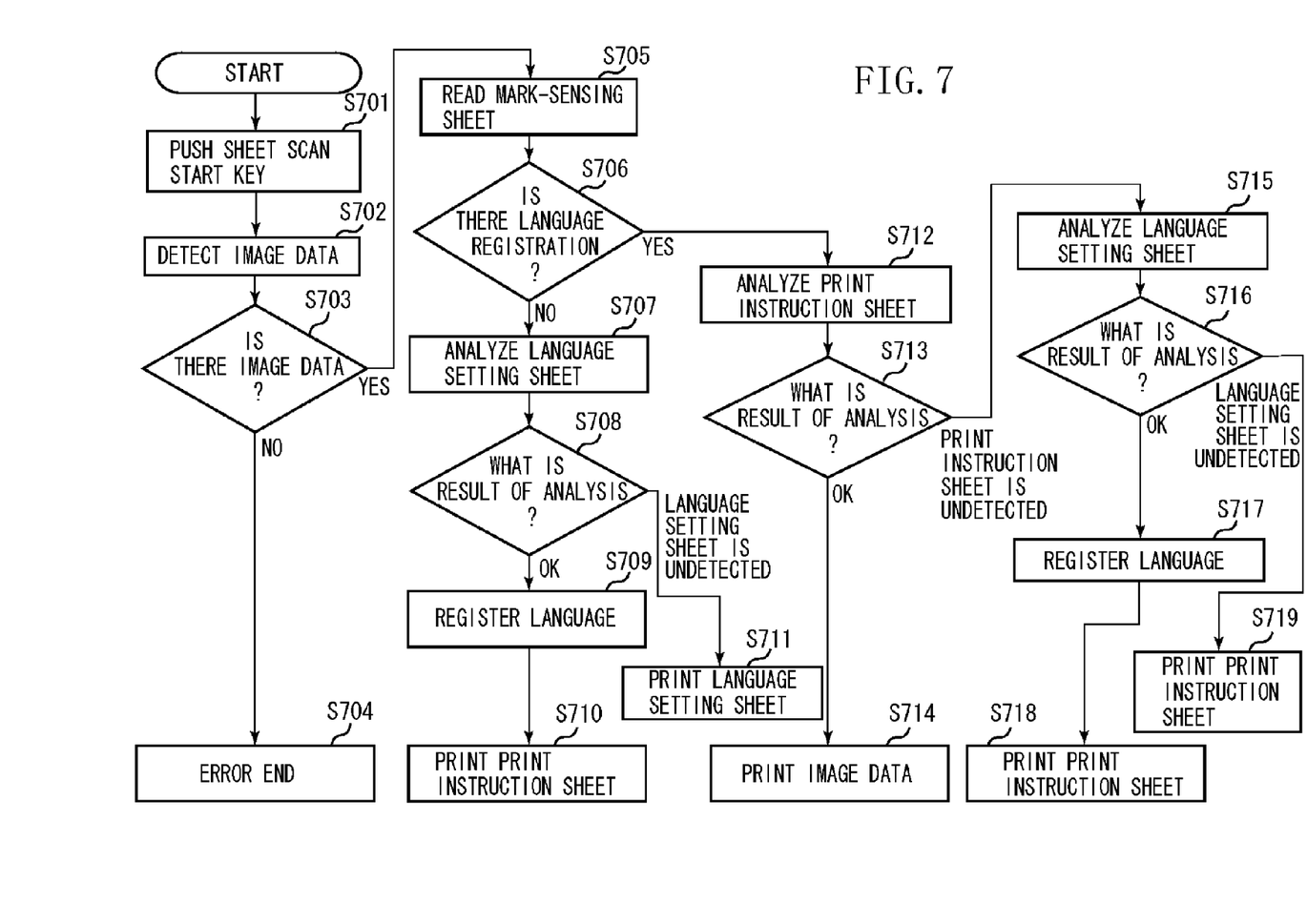
FIG. 7 is a flowchart illustrating a procedure for printing according to pressing of a predetermined key.

FIG. 7 is a flowchart illustrating a procedure for printing in response to pressing of a predetermined key. More specifically, FIG. 7 illustrates processing for performing the direct photography printing using the language setting sheet 500 and the print instruction sheet 600 when the memory card storing image data is mounted. An outline of the direct photography printing will be described.

In step S701, the user presses the sheet scan start key in the operation unit 101. In step S702, the MFP 100 detects the image data in the memory card inserted in the card interface 102. In step S703, the MFP 100 determines whether there is image data in the memory card based on a result of the detection in step S702. More specifically, in steps S702, the MFP 100 tries to access the memory card and, in step S703, diverges following processing according to presence or absence of the image data. When the MFP 100 does not detect the image data (NO in step S703), processing proceeds to step S704 and the MFP 100 does not execute any processing and ends processing.

It is determined whether there is the image data in the memory card in step S703, before the MFP 100 performs processing using the mark-sensing sheet. By this determination, the MFP 100 can inform a user that whether the readable image data is included in the memory card or the memory card is not inserted in the card interface 102. For example, when the user presses the sheet scan start key to start the direct photography printing without inserting the memory card into the card interface 102, the MFP 100 informs the user that the user needs to prepare the memory card.

On the other hand, when the MFP 100 detects the image data (YES in step S703), processing proceeds to step S705 and the reading unit 103 performs scanning to read the mark-sensing sheet. In step S706, the MFP 100 determines whether a language to be used in the print instruction sheet 600 is registered in the MFP 100. Based on the language registration determination in step S706, the MFP 100 determines whether the print instruction sheet 600 or the language setting sheet 500 is used as a target for analyzing the data read in step S705.

If the MFP 100 determines that the language used in the print instruction sheet 600 is not registered in the MFP 100 (NO in step S706), then in steps S707 to S711, the MFP 100 registers the language. The language registration is described below.

In step S707, when the language used in the print instruction sheet 600 is not registered in the MFP 100, the MFP 100 analyzes whether the language setting sheet 500 is read, from the image data read in step S705. The MFP 100 can perform the analysis based on features such as a layout of the language setting sheet, or by providing a barcode indicating a type of a sheet when the language setting sheet 500 is printed and reading the barcode.

In step S708, the MFP 100 determines whether the language setting sheet 500 is read based on a result of analysis. If the MFP 100 determines that the language setting sheet 500 is read (YES in step S708), then in step S709, the MFP 100 registers the language to be used in the print instruction sheet 600 in the MFP 100 based on the result of analysis in step S707. When the MFP 100 cannot specify a language selected, e.g., the user does not fill out the language setting sheet, the processing can be ended as an error.

Figure 8:
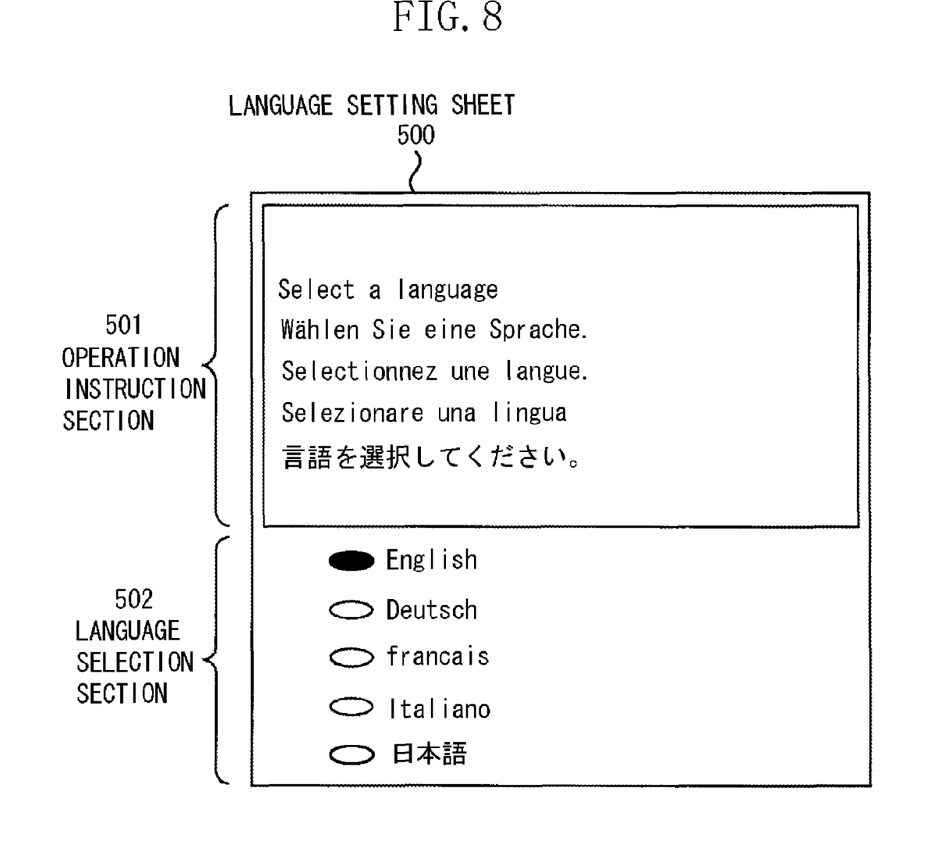
FIG. 8 illustrates an example of a filled-out language setting sheet in an exemplary embodiment.

An example of setting of a language by the language setting sheet will be described. FIG. 8 illustrates an example of a filled-out language setting sheet 500 in the exemplary embodiment. For example, a case is described where the language setting sheet 500 illustrated in FIG. 5 is filled out as illustrated in FIG. 8. In this example, since the user marks English in the language selection section 502, the MFP 100 sets English as the language to be used when the print instruction sheet 600 is printed.

In step S710, the recording unit 104 prints the print instruction sheet 600 after the MFP 100 registers the language in step S709. Accordingly, the user can print the print instruction sheet 600 described in the registered language only by pressing the sheet scan start key. Further, the user can confirm whether the MFP 100 sets the language marked in the language setting sheet 500 by directly looking at the print instruction sheet 600 printed in step S710.

In step S708, if the MFP 100 determines that the language setting sheet 500 is not read (NO in step S708), then in step S711, the recording unit 104 prints the language setting sheet 500.

An example of printing of the language setting sheet in step S711 will be described. In this example, a user inserts a memory card into the card interface 102 in the MFP 100 in which a language to be used in the print instruction sheet 600 is unregistered at a time of shipping, presses the sheet scan start key, and starts the direct photography printing.

When the MFP 100 initially performs the direct photography printing, both the language setting sheet 500 and the print instruction sheet 600 are not prepared, so that a mark-sensing sheet is not placed on the reading unit 103. Therefore, the MFP 100 determines that no language is registered in step S706 (NO in step S706), and determines that the language setting sheet is not read in step S708 (NO in step S708). Thus, in step S711, the recording unit 104 prints the language setting sheet 500. Thus, since the recording unit 104 prints the language setting sheet 500 after the user presses the sheet scan start key, the user can understand that it is necessary to fill out the language setting sheet 500 and set a language at first.

As for another method for printing the language setting sheet 500, a language setting sheet print key for printing the language setting sheet 500 can be provided in the operation unit 101, and a user presses the key to print the language setting sheet 500. For example, when the language setting sheet 500 is needed to reset a language in the MFP 100 in which the language is already registered, the user can print the language setting sheet 500 only by pressing the language setting sheet print key.

In step S706, when the MFP 100 determines that the language to be used in the print instruction sheet 600 is registered in the MFP 100 (YES in step S706), processing proceeds to steps S712 to S719 and the MFP 100 performs the direct photography printing. Processing in steps S712 to S719 will be described.

If the language to be used in the print instruction sheet 600 is registered in the MFP 100 (YES in step S706), then in step S712, the MFP 100 analyzes whether the print instruction sheet 600 is read based on the image data read in step S705. The MFP 100 can perform the analysis based on the features such as a layout of the print instruction sheet or a barcode provided on the sheet.

In step S713, the MFP 100 determines whether the print instruction sheet 600 is read as a result of the analysis. When the print instruction sheet 600 is read (YES in step S713), then in step S714, the MFP 100 prints image data in the memory card based on the analyzed image data. If selection of the image data by the user is not specified, e.g., the user does not fill out the print instruction sheet 600, the MFP 100 may end the processing as an error.

Figure 9:
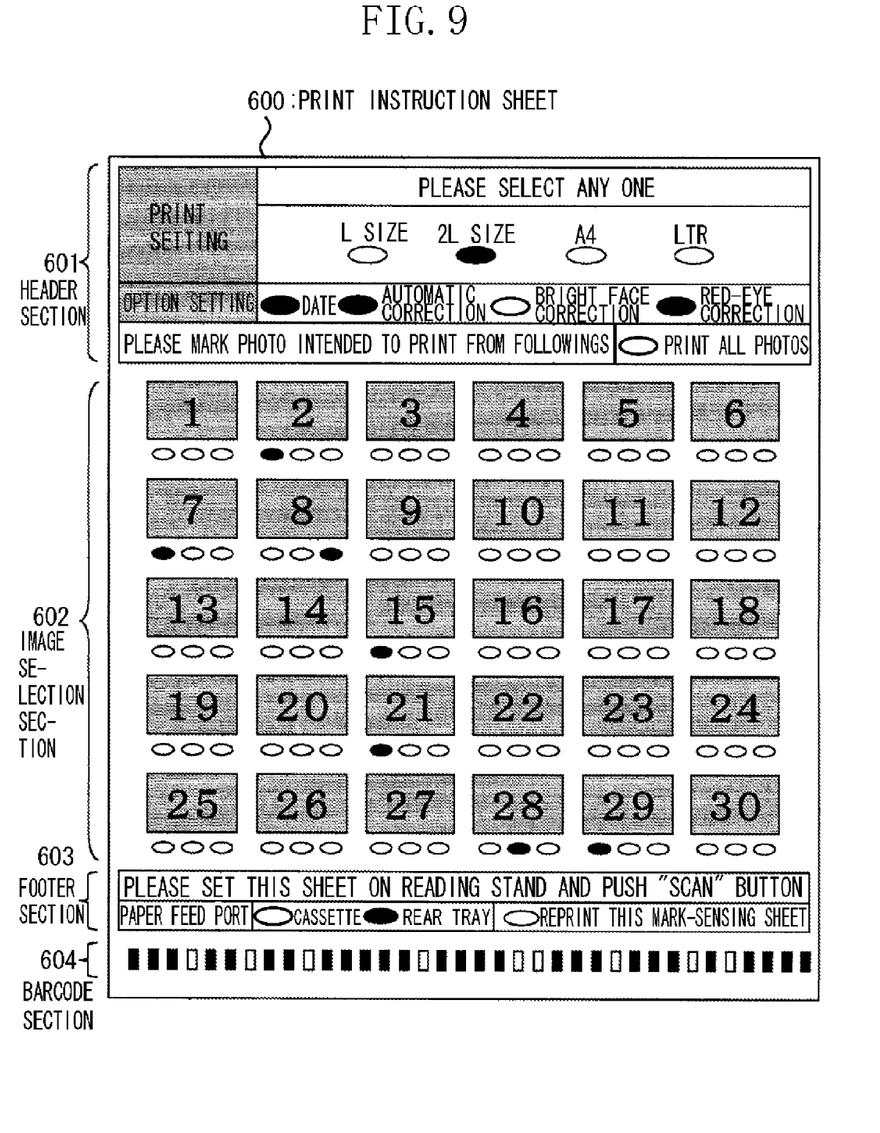
FIG. 9 illustrates an example of a filled-out print instruction sheet in the exemplary embodiments.

An example of printing of the image data by the print instruction sheet 600 will be described. FIG. 9 illustrates an example of a filled-out print instruction sheet 600 in the exemplary embodiment. For example, the print instruction sheet 600 illustrated in FIG. 6 is filled out as illustrated in FIG. 9.

In the example illustrated in FIG. 9, a 2L size is marked in "print setting" in the header section 601, and the date, automatic correction, and red-eye correction are marked in "option setting". In the image selection section 602, a total number of 7 images of "2", "7", "8", "15", "21", "28", and "29" are marked. In "paper feed port" in the footer section 603, "rear tray" is marked. Based on the marked information, the MFP 100 performs image processing of the selected 7 images, and prints the selected 7 images on a sheet of 2L size set on the rear tray.

When the MFP 100 determines that the print instruction sheet 600 is not read in step S713 (NO in step S713), the MFP 100 determines whether the language setting sheet 500 is placed on the reading unit 103. The reason of this processing is that the user may cause the reading unit 103 to read the language setting sheet 500 in order to change a registered language.

Processing from steps S715 to S718 is similar to the processing from steps S707 to S710. The MFP 100 can reset a language by performing language registration even when the language to be used in the print instruction sheet 600 is registered. When the user causes the MFP 100 to read the language setting sheet 500 which is placed on the reading unit 103 to register a language, the MFP 100 determines that the language setting sheet is read in step S716 (YES in S716), but a language to be registered in step S717 is not changed. When the MFP 100 prints the print instruction sheet 600 in step S718 in the language which is not changed, the user can understand that it is necessary to read the print instruction sheet 600.

When the MFP 100 determines that the print instruction sheet 600 is not read in step S713 (NO in step S713) and further determines that the language setting sheet 500 is not read in step S716 (NO in step S716), processing proceeds to step S719. In step S719, the recording unit 104 prints the print instruction sheet 600 since the language to be used in the print instruction sheet 600 is already registered.

An example of printing of the print instruction sheet 600 in step S719 will be described. In this example, the user inserts the memory card into the card interface 102 in the MFP 100 in which the language to be used in the print instruction sheet 600 is registered, presses the sheet scan start key, and starts the direct photography printing. In this case, the MFP 100 determines that the print instruction sheet 600 is not read in step S713 (NO in step S713), and further determines that the language setting sheet 500 is not read in step S716 (NO in step S716). Thus, in step S719, the recording unit 104 prints the print instruction sheet 600. In other words, when the user presses the sheet scan start key without placing the sheet, the recording unit 104 prints the print instruction sheet 600. Thus, the user can understand that it is necessary to fill out the print instruction sheet 600 and causes the MFP 100 to read the sheet as an operation for performing photography printing.

By repeating the above described processing procedure of FIG. 7, the user can acquire a sheet necessary at that moment only by pressing the sheet scan start key.

A case is described in which the language to be used in the print instruction sheet 600 is unregistered at the time of shipping, and a user inserts a memory card into the card interface 102 and starts direct photography printing for the first time. At the beginning of processing, both the language setting sheet 500 and the print instruction sheet 600 are not printed. Thus, in step S701, the user presses the sheet scan start key without placing a mark-sensing sheet on the reading unit 103. Then, in step S711, after detecting the image data, since a language is not registered, the MFP 100 prints the language setting sheet 500.

Thus, the user can understand that it is necessary to set a language using the language setting sheet 500 printed in step S711. Then, the user fills out the language setting sheet 500 and places the language setting sheet 500 on the reading unit 103. Then, in step S701, the user presses again the sheet scan start key. The MFP 100 analyzes the scanned image data and sets the language designated by the user. Then, in step S710, the MFP 100 prints the print instruction sheet 600 using the designated language.

The user can understand that it is necessary to perform print setting for a photograph, from the output print instruction sheet 600. The user fills out the print instruction sheet 600 and places the print instruction sheet 600 on the reading unit 103. Then, in step S701, the user presses again the sheet scan start key. The MFP 100 analyzes the print instruction sheet 600 and prints the photograph designated by the user.

On the other hand, a case will be described when the user inserts the memory card into the card interface 102 in the MFP 100 in which the language to be used in the print instruction sheet 600 is registered at the time of shipping, presses the sheet scan start key, and starts initial direct photography printing for the first time.

In such a case, at the beginning of the processing, both the language setting sheet 500 and the print instruction sheet 600 are not printed. Thus, in step S701, the user presses the sheet scan start key while a mark-sensing sheet is not placed on the reading unit 103. In steps S702 and S703, the MFP 100 detects image data in the memory card, checks whether there is image data to be printed in the memory card, and determines whether the direct photography printing can be executed. In step S719, after detecting the image data, the MFP 100 prints the print instruction sheet 600 using the language which is already registered.

The user can understand that it is necessary to perform print setting for a photograph, from the output print instruction sheet 600. The user fills out the print instruction sheet 600 and places the print instruction sheet 600 on the reading unit 103. Then, in step S701, the user presses again the sheet scan start key. By this operation, the MFP 100 analyzes the image data read from the print instruction sheet 600. Then, in step S714, the MFP 100 prints the photograph designated by the user.

If the MFP 100 according to the present exemplary embodiment is shipped to a region where it is expected that a kind of language to be used is limited, a manufacturer can ship the MFP 100 in which the languages to be used are registered. When the MFP 100 is shipped to a region where it is expected that a plurality of languages is used, the manufacturer can ship the MFP 100 in which a language is not registered.

In such cases, when the language to be used is not registered at the time of shipping, a user can automatically print the language setting sheet only by pressing the sheet scan start key according to the processing procedure illustrated in FIG. 7. When the language to be used is registered at the time of shipping, a user can automatically print the print instruction sheet only by pressing the sheet scan key. Therefore, according to the exemplary embodiment, when the language to be used in the print instruction sheet 600 is already registered in the MFP 100 at the time of shipping, a user does not need to perform language setting.

According to the aforementioned processing, it is realized that the MFP 100 determines whether a language designated by the language registration determination in step S706 is registered, and a mark-sensing sheet to be used subsequently in the next processing can be printed according to an analysis result of the mark-sensing sheet, after pressing only one key. Therefore, the MFP 100 allows a user to understand a necessary operation without using a manual on a display device. When the MFP 100 cannot detect a sheet to be read, as a result of reading, the MFP 100 can print a necessary sheet and allow a user to easily understand an operation without a help such as a manual.

Further, when a user performs language setting displayed on a mark-sensing sheet, the user can print a sheet using the designated language only by pressing a predetermined key. Thus, the user can easily confirm that the language is set as designated by the user.

In the present invention, since a user can print a necessary sheet only by pressing one predetermined key, operation procedures from language setting to printing a photograph can be performed easily. Even when a MFP does not include a device that gives an instruction for an operation, such as a display device, the MFP can indicate a printing operation by a sheet scanning system to a user.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A device comprising:
an executing unit configured to execute a first function using a language registered on the device, according to an instruction by a user;
a determining unit configured to determine whether the language used for the first function is registered on the device;
a control unit configured to cause, in a case where the executing of the first function by the executing unit is designated by the user and the determining unit determines the language is not registered, the device to execute a second function to register the language on the device.

2. A method for a device, the method comprising:
executing a first function using a language registered on the device, according to an instruction by a user;
determining whether the language used for the first function is registered on the device;
causing, in a case where the executing of the first function is designated by the user and it is determined that the language is not registered, the device to execute a second function to register the language on the device.

3. A non-transitory computer-readable storage medium storing a program for causing a computer to execute the method according to claim 2.

* * * * *